US009227654B2

(12) United States Patent
Wolf et al.

(10) Patent No.: US 9,227,654 B2
(45) Date of Patent: Jan. 5, 2016

(54) GROUND ROBOT DRIVE SYSTEM

(71) Applicant: ROBO-TEAM LTD., Tel Aviv (IL)

(72) Inventors: Yosi Wolf, Tel-Aviv (IL); Elad Levy, Tel-Aviv (IL); Mor Rotbart, Herzlyia (IL)

(73) Assignee: Robo-Team Ltd., Tel Aviv (IL)

( * ) Notice: Subject to any disclaimer, the term of this patent is extended or adjusted under 35 U.S.C. 154(b) by 0 days.

(21) Appl. No.: 14/501,315

(22) Filed: Sep. 30, 2014

(65) Prior Publication Data

US 2015/0210327 A1 Jul. 30, 2015

(51) Int. Cl.
*B62D 5/02* (2006.01)
*B62D 55/084* (2006.01)
*B62D 55/04* (2006.01)
*B62D 55/075* (2006.01)

(52) U.S. Cl.
CPC *B62D 5/02* (2013.01); *B62D 55/04* (2013.01); *B62D 55/075* (2013.01); *B62D 55/084* (2013.01)

(58) Field of Classification Search
CPC ..... B62D 55/02; B62D 55/065; B62D 55/075
USPC ....................................... 180/9.32
See application file for complete search history.

(56) References Cited

U.S. PATENT DOCUMENTS

| 3,288,234 | A  | * | 11/1966 | Feliz | 180/6.5 |
| 6,263,989 | B1 | * | 7/2001 | Won | 180/9.32 |
| 7,654,348 | B2 | * | 2/2010 | Ohm et al. | 180/9.32 |
| 2013/0270017 | A1 | * | 10/2013 | Wolf et al. | 180/9.32 |
| 2014/0166377 | A1 | * | 6/2014 | Terrien et al. | 180/9.32 |

FOREIGN PATENT DOCUMENTS

EP          1502843 A2 * 2/2005

* cited by examiner

*Primary Examiner* — Kevin Hurley
(74) *Attorney, Agent, or Firm* — Roach Brown McCarthy & Gruber, P.C.; Kevin D. McCarthy

(57) ABSTRACT

A ground robot having a main body, two opposing drive systems, a flipper disposed distal to the main body, and a front wheel and a rear wheel, both disposed substantially parallel to the vertical plane and between the inner track and the flipper. The main body has a sagittal plane and two opposing lateral sides. Each drive system having an inner track disposed proximal to the main body. The inner track extends along a corresponding lateral side of the two opposing lateral sides and substantially parallel to a vertical plane of the main body, and is supported by a plurality of inner pulleys. The flipper extending along the corresponding lateral side and substantially parallel to the vertical plane. The flipper has a flipper body, an outer track, and a plurality of outer pulleys supporting the outer track. The diameter of the front wheel and the rear wheel of each of the opposing drive systems ranges between 1.2 to 1.3 times of a diameter of the inner track.

16 Claims, 3 Drawing Sheets

GROUND ROBOT DRIVE SYSTEM

FIELD OF THE INVENTION

The present invention relates to the field of tracked drive systems.

BACKGROUND

Ground robots face many challenges when attempting mobility. Terrain can vary widely, including for example, loose and shifting materials, obstacles, vegetation, limited width openings, limited height openings, steps, uneven surfaces, tunnels, holes and the like. A variety of mobility configurations have been adapted to transverse difficult terrain. These options include legs, wheels and tracks. Legged robots can be agile, but use complex control mechanisms to move and achieve stability. Tracked robots have traditionally been configured in a tank-like configuration. Flippers are also used in robotic platforms for climbing obstacles such as stairs, rocks and slopes.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a ground robot comprising: a main body having a sagittal plane and two opposing lateral sides; two opposing drive systems, each located at one of said two opposing lateral sides and each comprising: an inner track disposed proximal to the main body, the inner track extending along a corresponding lateral side of the two opposing lateral sides and substantially parallel to a vertical plane of the main body, wherein the inner track is supported by a plurality of inner pulleys; a flipper disposed distal to the main body, the flipper extending along the corresponding lateral side and substantially parallel to the vertical plane, wherein the flipper comprises: a flipper body, an outer track, and a plurality of outer pulleys supporting the outer track; and a front wheel and a rear wheel, both disposed substantially parallel to the vertical plane and between the inner track and the flipper, wherein a diameter of the front wheel and the rear wheel of each of the opposing drive systems ranges between 1.2 to 1.3 times of a diameter of the inner track.

In some embodiments, each of the front wheel and the rear wheel comprises, on an external surface thereof, a plurality of wheel projections.

In some embodiments, the inner track comprises, on an external surface thereof, a plurality of inner track projections protruding outwards with respect to the inner track.

In some embodiments, the outer track comprises, on an external surface thereof, a plurality of outer track projections protruding outwards with respect to the outer track.

In some embodiments, the diameter of the inner track of each of the two opposing drive systems and the diameter of the outer track of each of the two opposing drive systems are substantially equal.

In some embodiments, for each flipper of the two opposing flippers, the plurality of outer pulleys comprise a front outer pulley and a rear outer pulley, and wherein the front outer pulley is pivotal about a front central hinge of the front wheel.

In some embodiments, a rotation of the inner track, the front wheel, the rear wheel of the two opposing drive systems and a rotation of the outer track of the two opposing flippers are synchronized.

In some embodiments, for each opposing drive system, the plurality of inner pulleys comprises a front inner pulley and a rear inner pulley.

In some embodiments, each drive system of the two opposing drive systems further comprises: a front central hinge configured to rotate the front inner pulley and the front wheel in a common manner; and a rear central hinge configured to rotate the rear inner pulley and the rear wheel in a common manner.

In some embodiments, at least one flipper of the two opposing flippers is tilted on a plane parallel to the vertical plane.

In some embodiments, the at least one flipper has an operational mode and a folded mode.

In some embodiments, each flipper of the two opposing flippers may be tilted independently with respect to the other flipper.

In some embodiments, the inner pulleys and the outer pulleys comprise annular projections; and the inner track and the outer track comprise multiple cogs connected in a parallel manner forming a niche for receiving the annular projections of the respective supporting pulleys.

In some embodiments, said ground robot is configured to be remotely controlled.

In some embodiments, the inner track extends along 70-130% of the corresponding lateral side.

In some embodiments, the flipper extends along 70-130% of the corresponding lateral side.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

A drive system for a ground robot is disclosed herein. The drive system may allow an efficient use of tracks and flippers, which may be desired when the ground robot traverses an unleveled and/or tough terrain, including, for example, obstacles or stairs. Furthermore, the disclosed technique avoids unnecessary use of a changing mechanism between a wheeled drive (i.e., using wheels) and a tracked drive (i.e., using tracks).

The term "about", as used herein with respect to one or more values, including a range of values, may refer to the one or more values $\pm 10\%$.

The term "track", as used herein, may refer to a closed-loop structure, optionally polymeric and optionally flexible, used for ground propulsion.

The term "robotic", and its derivations as used herein, may refer to a controllable computerized mechanical element or device.

The term "diameter", as used herein with respect to a wheel or a pulley, may refer to an external and maximal diameter of the wheel or the pulley, i.e., including any projections they might have on their external surface.

The term "diameter", as used herein with respect to a track, may refer to the diameter of the pulley, with the addition of twice the thickness of the track mounted on it including the track projections.

Figure 1:
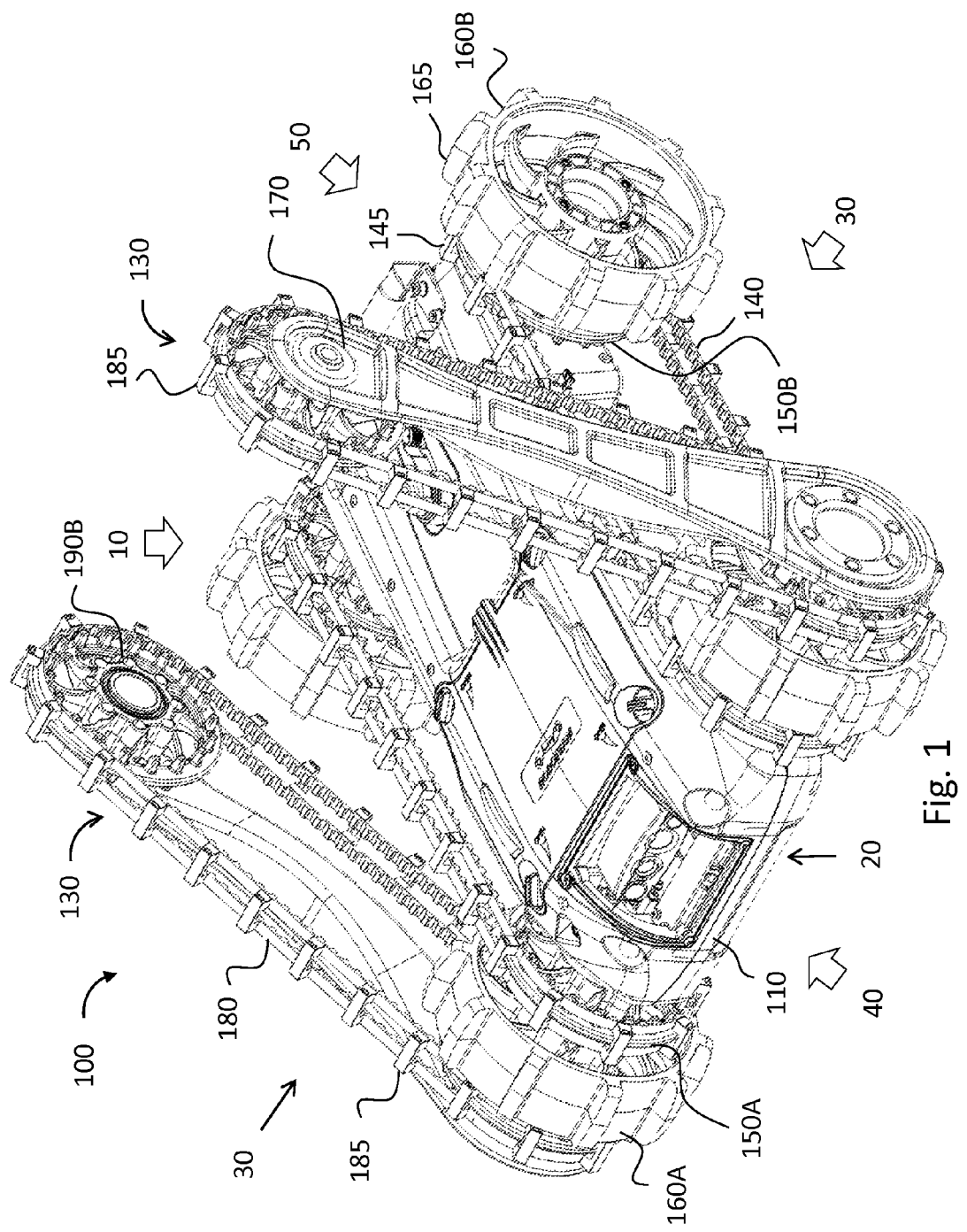
FIG. 1 shows an isometric view of an exemplary ground robot.
Figure 2:
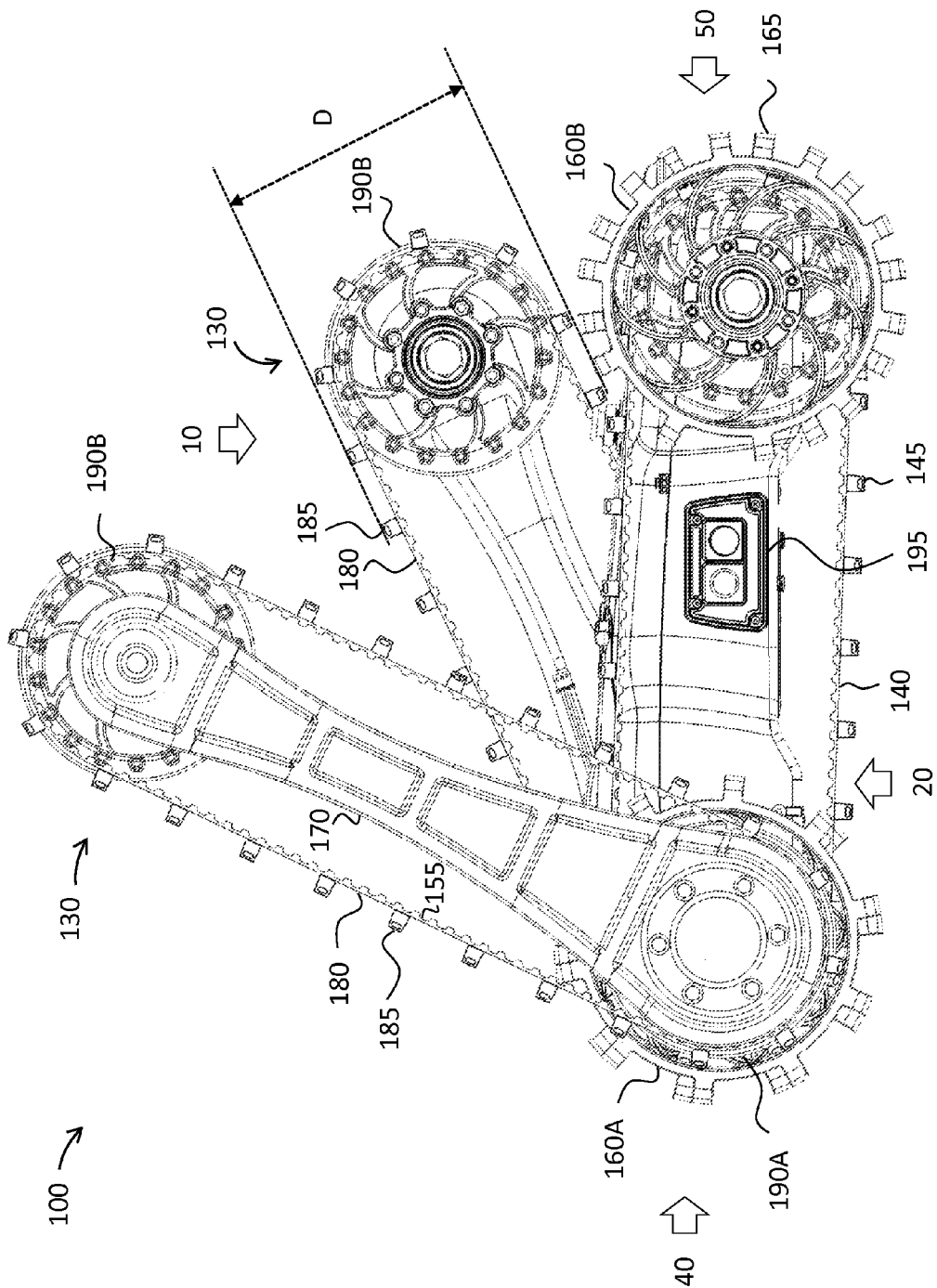
FIG. 2 shows a side view of the ground robot of FIG. 1.
Figure 3:
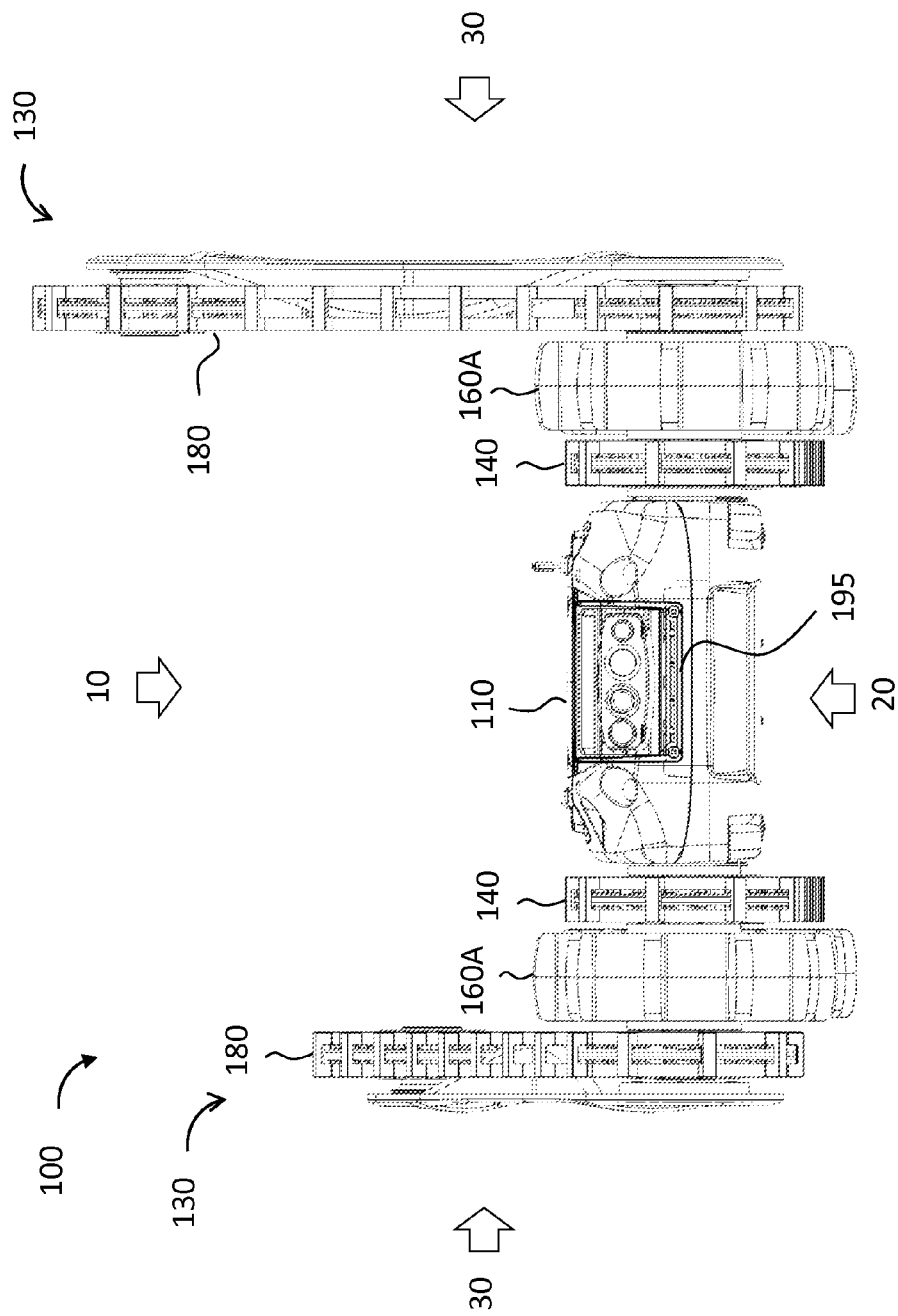
FIG. 3 shows a front view of the ground robot of FIG. 1.

Reference is now made to FIGS. 1, 2 and 3. FIG. 1 shows an isometric view of an exemplary ground robot (hereinafter "robot") 100. FIG. 2 shows a side view of ground robot 100 of FIG. 1. FIG. 3 shows a front view of ground robot 100 of FIG. 3.

Ground robot 100 may include a main body 110 and two opposing drive systems. Main body 110 may have a vertical plane (not shown) being, essentially, the sagittal plane of the main body. The vertical plane may extend along a length of the main body and divide the body into two halves, wherein each half includes one of the drive systems. Each one of the drive systems may include:

an inner track 140 disposed, for example, proximal to main body 110 and substantially parallel to the vertical plane, wherein the inner track may be supported by a plurality of inner pulleys such as a front inner pulley 150A and a rear inner pulley 150B;

a flipper 130 disposed, for example, distal to main body 110 and substantially parallel to the vertical plane, wherein the flipper may include a flipper body 170, an outer track 180 and a plurality of outer pulleys such as a front outer pulley 190A and a rear outer pulley 190B;

a front wheel 160A and a rear wheel 160B, both disposed, for example, substantially parallel to the vertical plane and between inner track 140 and flipper 130. Main body 110 and correspondingly ground robot 100 may have a top 10, a bottom 20, two opposing lateral sides 30, a front 40 (shown in FIGS. 2 and 3) and a rear 50 (shown in FIGS. 2 and 3).

Flippers 130 may be, for example, robotic elements which include a moving mechanism that may enhance the obstacle climbing capabilities of the ground robot.

Inner track 140 may extend along and may be supported by inner pulleys 150A-B. Inner track 140 of each drive system may extend along the corresponding lateral side 30, as shown in FIGS. 1 and 2. For example, inner track 140 may extend along 70-130% of the corresponding lateral side 30. Thus, inner track 140 may, for example, extend approximately to the length of the corresponding lateral side 30 of robot 100. Front inner pulley 150A and rear inner pulley 150B may be located at each of lateral sides 30. Each of front inner pulleys 150A may be located relatively close to the front of ground robot 100 and rear inner pulleys 150B may be located relatively close to rear 50 of ground robot 100, as shown in FIG. 1. Inner pulleys 150A-B may be mounted on main body 110.

Outer track 180 may extend along and may be supported by front outer pulley 190A and rear outer pulley 190B. Each flipper 130 and accordingly each outer track 180 may extend along the corresponding lateral side 30, as shown in FIGS. 1 and 2. For example, flipper 130 and outer track 180 may extend along 70-130% of the corresponding lateral side 30. Thus, outer track 180 may, for example, extend approximately to the length of the corresponding lateral side 30 of robot 100. Front outer pulley 190A and rear outer pulley 190B may be located at each of opposing lateral sides 30. Each of front outer pulleys 190A may be located close to the front of ground robot 100 and each of rear outer pulleys 190B may be located close to rear 50 of ground robot 100, as shown in FIGS. 1 and 2. Outer pulleys 190A-B may be mounted on flipper body 170.

Flipper body 170 and therefore flipper 130 may be mounted on front wheel 160A. Front outer pulley 190A may be pivotal about a front central hinge of front wheel 160A to allow flipper body 170 and therefore flipper 130 to be tilted with respect to main body 110, as shown in FIG. 2. Flipper 130 may be tilted on a plane parallel to the vertical plain of main body 110. Tiltable flipper 130 may be used for overcoming obstacles, such as stairs, and as further described below.

Flipper 130 may be mounted on front wheel 160A through a hinge, a joint, a pivot and/or another moveable link which enables flipper 130 to have an operational mode and a folded mode. In the folded mode flipper 130 may be substantially parallel to and may extend along inner track 140 and the corresponding lateral side 30 of main body 110. In the operational mode flipper 130 may be tilted away from inner track 140 and the corresponding lateral side 30 such that flipper 130 may no longer extend along them, as shown in FIGS. 1, 2 and 3. Each flipper 130 of the two flippers 130 may be tilted independently with respect to the other flipper. For example, a right flipper 130 may be tilted in an independent manner with respect to a left flipper 130 and vice versa. In some embodiments, flippers 130 may be each rotated about a rotation axis such as a hinge, a joint or a pivot in 360 degrees. Flipper 130 may include a flipper motor for tilting flipper 130. The motor may be a DC servo motor. The flipper motor may rotate flipper 130 independently and regardless of the rotation of wheels 160A-B and outer pulleys 190A-B.

Front wheel 160A and rear wheel 160B may include a plurality of wheel projections 165, on an external surface thereof, protruding outwards with respect to front wheel 160A and rear wheel 160B accordingly to allow a hold of the terrain. Wheel projections 165 may be oblong and may be positioned in a serial manner along the circumference of front wheel 160A and rear wheel 160B accordingly. Front wheel 160A and rear wheel 160B may be located at each lateral side 30 of ground robot 100. Front wheel 160A may be located close to front 40 of ground robot 100 and rear wheel 160B may be located close to rear 50 of ground robot 100, as shown in FIG. 2. Front wheel 160A and rear wheel 160B may be positioned proximal to front inner pulley 150A and rear inner pulley 150B correspondingly, proximal to inner track 140 and distal to main body 110, as shown in FIGS. 1 and 3. Furthermore, front wheel 160A and rear wheel 160B may be positioned between inner track 140 and outer track 180, as shown in FIG. 3. Front inner pulleys 150A and front wheel 160A may be rotated about a front common axis, e.g., the front central hinge of front wheel 160A. Rear inner pulley 150B and rear wheel 160B may be rotated about a rear common axis, e.g., a rear central hinge of rear wheel 160B.

Inner track 140 and outer track 180 may each be continuous, namely—form a closed loop Inner pulleys 150A-B and outer pulleys 190A-B may receive torque from a motor (not shown) and may transfer it to inner track 140 and outer track 180 correspondingly by physically grasping the track thereby setting the track into motion. Inner pulleys 150A-B and outer pulleys 190A-B may include annular projections. Inner track 140 and/or outer track 180 may include multiple cogs which may be connected in a parallel manner, forming a niche 155 for receiving the annular projections of the respective supporting pulleys, as shown in FIG. 2. Inner track 140 may include a plurality of inner track projections 145, on an external surface thereof, protruding outwards with respect to inner track 140 and main body 110, as shown in FIGS. 2 and 3. Outer track 180 may include a plurality of outer track projections 185, on an external surface thereof, protruding outwards with respect to outer track 180 and flipper body 170, as shown in FIGS. 2 and 3. Inner track projections 145 and outer track projections 185 may be utilized to hold the terrain and allow the mobilization of ground robot 100 by the tracks. Therefore, the combination of inner pulleys 150A-B and inner track 140 and furthermore, the combination of outer pulleys 190A-B and outer track 180 may mobilize main ground robot 100.

According to an aspect of some embodiments, a reliability of the track may increase as measured by the chances of it being thrown off a pulley, get stuck or otherwise become unable to mobilize a platform. The structure of the annular projections of the pulleys which may fit into the niches between the cogs may centralize the tracks in a way that increase tracks' reliability.

A rotation of inner tracks 140, front wheels 160A and rear wheels 160B of the opposing drive systems and a rotation of outer tracks 180 of opposing flippers 130 may be synchronized. For example, each of the opposing drive systems may be propelled by a drive motor. The drive motor may be, for example, a brushless DC motor that drives a spur gear type gearbox. The two drive motors may be connected at the front part of main body 110. For each opposing drive system, the drive motor may transfer torque to front pulley 150A. Front pulley 150A may spin inner track 140, which then may spin rear pulley 150B. Rear pulley 150B may be rigidly and operatively coupled with rear wheel 160B. Front pulley 150A may be rigidly and operatively coupled with front wheel 160A. Front wheel 160A may be rigidly and operatively coupled with front outer pulley 190A. These rigid couplings may transfer the torque to front and rear wheels 160A-B and to outer track 180 of each flipper 130. Front outer pulley 190A may spin outer track 180 which then spins rear outer pulley 190B. Thus, front inner pulley 150A, front wheel 160A and front outer pulley 190A may be the "drivers" while all the other pulleys and wheels may be idlers.

A diameter of front wheel 160A and rear wheel 160B of each of the opposing drive systems may range between 1.2 to 1.3 times of a diameter of inner track 140. The diameter of front wheel 160A and rear wheel 160B of each of the opposing drive systems may range between 1.2 to 1.3 times of a diameter of outer track 180. A diameter of a track according to the disclosed technique is illustrated in FIG. 2 with respect to outer track 180, indicated "D". In some embodiments, the diameter of inner track 140 and outer tracks 180 may be substantially equal. For example, inner track 140 and outer track 180 may have an equal diameter of 130 millimeter. The diameter of front wheel 160A and rear wheel 160B may be 160 millimeter. The ratio between front wheel 160A and rear wheel 160B diameter and inner track 140 and outer track 180 may be then 1.23.

The ratio may allow efficient use of the inner and/or outer tracks and may allow avoiding the use of a changing mechanism between a wheeled drive, which may be preferred in a leveled terrain, and a tracked drive, which may be preferred in an unleveled and/or rough terrain such as stairs. A configuration of the outer and/or inner pulleys and the front and rear wheels, such as when all are pivotal about a single central hinge of the front wheel and a single central hinge of the rear wheel correspondingly, may allow for the inner and/or outer tracks to float (i.e., not touch the ground) when the ground robot traverses a leveled terrain. Thus, in a leveled terrain, only the front wheels and rear wheels may be used and the inner and/or outer tracks may not interfere with the movement of the ground robot. Furthermore, such configuration may decrease the level of noise, when the ground robot drives on a leveled terrain, as the contact area between the ground robot and the terrain may be smaller. Thus, the tactical capabilities of the ground robot may be enhanced. On the other hand, when the ground robot traverses an unleveled and/or rough terrain, the ratio between the wheels and the inner and/or outer pulleys allows efficient use of the tracks, which now may assist and participate in the movement of the ground robot by contacting the terrain.

The ratio between the diameter of the tracks and the wheels may determine the extent of the use of the tracks with respect to terrain level differences encountered by the ground robot. That is to say, as the tracks diameter is larger and closer to the wheels diameter, a smaller terrain level difference may lead to involvement of the tracks in the ground robot drive. In such a case the extent of the tracks involvement in the ground robot drive may be larger. On the other hand, as the tracks diameter is smaller with respect to the wheels diameter, only a larger terrain level difference may lead to involvement of the tracks in the ground robot drive. In such a case the extent of the tracks involvement in the ground robot drive may be smaller.

In some embodiments, the ground robot may be remotely controlled, inter alia, to climb obstacles including, but not limited to, stairs, ditches, rocks, sewer tunnels, and uneven rough terrain.

In some embodiments, the length of the flipper and/or the main body may be about 67 cm or more, which is the minimal length required for climbing a standard stair case by a ground robot, which has three points of contact with the stairs.

In some embodiments, the main body may be shaped with opposite central (upper and lower) niches, for example forming a shape similar to the sign infinity "∞". The lateral sides' shape may be curved and/or similar to the "infinity" sign, having round edges and a narrowing middle part. Optionally, lateral protection covers are also shaped with opposing niches to enable stretching the inner track and to prevent a collision between the inner track and the main body and/or the lateral covers. This shape may enable the ground robot to climb stairs and/or other vertical obstacles, as it prevents collisions between the narrow part of the infinity shape and the vertical obstacle and it may maximize the contact with the terrain on both sides of the vertical obstacle. The shape may also reduce the weight of the main body compared to a similar main body without an infinity shape.

In some embodiments, the flipper body may be shaped in an infinity shape encircled with the outer track, such as flipper body 170 as shown in FIGS. 1 and 2. The flipper body may have a bottom, top and lateral sides corresponding to the bottom, top and lateral sides of the ground robot. Optionally, a flexible outer track may be mounted on the infinity shaped flipper. The outer track may flex towards the narrow part of the infinity shape upon climbing over an obstacle, and/or application of external pressure. Optionally, the flipper body may preserve a distance between the outer track and the bottom of the flipper body. This is in order to avoid friction between the outer track and the flipper body while the outer track is flexed upwards, e.g., by traversed obstacles or stairs. Optionally, the bottom side and the top side of the infinity shaped flipper body are symmetric. Optionally, the bottom side and the top side symmetry enable the ground robot to flip bottom to top and function in a similar manner in both configurations.

In some embodiment, the right and/or left flippers may also be mounted in different locations with respect to the ground robot. In some embodiments, the flippers may be low weight flippers thereby contributing to overall ground robot low weight, which may be advantageous for higher speed and maneuverability.

In some embodiments, the ground robot may optionally have one or more image sensors 195, mounted in or on the main body, directly or by a moving or a static carrier. Image sensor 195 may be a 3D vision camera. Image sensor 195 may provide images of the ground robot's surrounding to an operator of the ground robot. Furthermore, image sensor 195 may be utilized to perform autonomous operations by the ground robot, such as movement.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A ground robot comprising:
   a main body having a sagittal plane and two opposing lateral sides;
   two opposing drive systems, each located at one of said two opposing lateral sides and each comprising:
   an inner track disposed proximal to the main body, the inner track extending along a corresponding lateral side of the two opposing lateral sides and substantially parallel to a vertical plane of the main body, wherein the inner track is supported by a plurality of inner pulleys;
   a flipper disposed distal to the main body, the flipper extending along the corresponding lateral side and substantially parallel to the vertical plane, wherein the flipper comprises:
   (a) a flipper body,
   (b) an outer track, and
   (c) a plurality of outer pulleys supporting the outer track; and
   a front wheel and a rear wheel, both disposed substantially parallel to the vertical plane and between the inner track and the flipper,
   wherein a diameter of the front wheel and the rear wheel of each of the opposing drive systems ranges between 1.2 to 1.3 times of a diameter of the inner track.

2. The ground robot of claim 1, wherein each of the front wheel and the rear wheel comprises, on an external surface thereof, a plurality of wheel projections.

3. The ground robot of claim 1, wherein the inner track comprises, on an external surface thereof, a plurality of inner track projections protruding outwards with respect to the inner track.

4. The ground robot of claim 1, wherein the outer track comprises, on an external surface thereof, a plurality of outer track projections protruding outwards with respect to the outer track.

5. The ground robot of claim 1, wherein the diameter of the inner track of each of the two opposing drive systems and the diameter of the outer track of each of the two opposing drive systems are substantially equal.

6. The ground robot of claim 1, wherein, for each flipper of the two opposing flippers, the plurality of outer pulleys comprise a front outer pulley and a rear outer pulley, and wherein the front outer pulley is pivotal about a front central hinge of the front wheel.

7. The ground robot of claim 1, wherein a rotation of the inner track, the front wheel, the rear wheel of the two opposing drive systems and a rotation of the outer track of the two opposing flippers are synchronized.

8. The ground robot of claim 1, wherein for each opposing drive system, the plurality of inner pulleys comprises a front inner pulley and a rear inner pulley.

9. The ground robot of claim 8, wherein each drive system of the two opposing drive systems further comprises:
   a front central hinge configured to rotate the front inner pulley and the front wheel in a common manner; and
   a rear central hinge configured to rotate the rear inner pulley and the rear wheel in a common manner.

10. The ground robot of claim 1, wherein at least one flipper of the two opposing flippers is tilted on a plane parallel to the vertical plane.

11. The ground robot of claim 10, wherein the at least one flipper has an operational mode and a folded mode.

12. The ground robot of claim 10, wherein each flipper of the two opposing flippers may be tilted independently with respect to the other flipper.

13. The ground robot of claim 1, wherein:
   the inner pulleys and the outer pulleys comprise annular projections; and
   the inner track and the outer track comprise multiple cogs connected in a parallel manner forming a niche for receiving the annular projections of the respective supporting pulleys.

14. The ground robot of claim 1, wherein said ground robot is configured to be remotely controlled.

15. The ground robot of claim 1, wherein the inner track extend along 70-130% of the corresponding lateral side.

16. The ground robot of claim 1, wherein the flipper extend along 70-130% of the corresponding lateral side.

* * * * *